United States Patent
Stewart et al.

(10) Patent No.: US 7,757,076 B2
(45) Date of Patent: Jul. 13, 2010

(54) METHOD AND APPARATUS FOR USING A SECURE CREDENTIAL INFRASTRUCTURE TO ACCESS VEHICLE COMPONENTS

(75) Inventors: Paul J. Stewart, Los Altos, CA (US); Diana K. Smetters, San Francisco, CA (US); Rebecca E. Grinter, San Francisco, CA (US); Dirk Balfanz, Menlo Park, CA (US); Glenn E. Durfee, San Francisco, CA (US); Hao-Chi Wong, San Carlos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 955 days.

(21) Appl. No.: 10/837,323

(22) Filed: Apr. 30, 2004

(65) Prior Publication Data

US 2005/0125669 A1      Jun. 9, 2005

Related U.S. Application Data

(60) Provisional application No. 60/527,938, filed on Dec. 8, 2003.

(51) Int. Cl.
*H04L 29/06* (2006.01)

(52) U.S. Cl. ........................ 713/156; 713/175

(58) Field of Classification Search ................ 713/171, 713/175
See application file for complete search history.

(56) References Cited

U.S. PATENT DOCUMENTS

| | | | | |
|---|---|---|---|---|
| 5,408,250 A | 4/1995 | Bier | ........................... | 345/169 |
| 5,519,778 A | 5/1996 | Leighton et al. | ............... | 380/30 |
| 5,539,824 A | 7/1996 | Bjorklund et al. | .............. | 380/21 |
| 6,064,741 A | 5/2000 | Horn et al. | .................. | 380/285 |
| 6,075,860 A | 6/2000 | Ketcham | ...................... | 380/25 |
| 6,105,133 A | 8/2000 | Fielder et al. | ............... | 713/169 |
| 6,243,373 B1 | 6/2001 | Turock | ........................ | 370/352 |
| 6,243,772 B1 | 6/2001 | Ghori et al. | ................... | 710/68 |
| 6,366,654 B1 | 4/2002 | Cramer et al. | ........... | 379/93.09 |
| 6,853,988 B1 * | 2/2005 | Dickinson et al. | ............. | 705/75 |
| 7,228,291 B2 * | 6/2007 | Seamons et al. | .............. | 705/37 |
| 2001/0048744 A1 | 12/2001 | Kimura | ...................... | 380/247 |
| 2002/0061748 A1 | 5/2002 | Nakakita et al. | ............ | 455/435 |
| 2002/0065065 A1 | 5/2002 | Lunsford et al. | ............ | 455/411 |
| 2002/0094087 A1 | 7/2002 | Dellmo et al. | .............. | 380/270 |
| 2002/0101993 A1 * | 8/2002 | Eskin | .......................... | 380/270 |

(Continued)

OTHER PUBLICATIONS

U.S. Appl. No. 60/480,909 entitled "Methods and Apparatus for Establishing and Using a Secure Credential Infrastructure" to Diana K. Smetters et al., filed Jun. 24, 2003.

(Continued)

*Primary Examiner*—Nasser Moazzami
*Assistant Examiner*—Carlton V Johnson
(74) *Attorney, Agent, or Firm*—Park Vaughan & Fleming LLP

(57) ABSTRACT

We present technology that allows layman computer users to simply create, provision, and maintain secured infrastructure—an instant PKI. This technology can be used in a wide variety of applications including enabling secure communications to components of a vehicle, and enabling secure communications between the vehicle and associated infrastructure.

25 Claims, 8 Drawing Sheets

U.S. PATENT DOCUMENTS

| | | | |
|---|---|---|---|
| 2002/0144109 A1* | 10/2002 | Benantar et al. | 713/156 |
| 2002/0147920 A1 | 10/2002 | Mauro | 713/200 |
| 2002/0159598 A1 | 10/2002 | Rubinstein et al. | 380/259 |
| 2003/0014646 A1 | 1/2003 | Buddhikot et al. | 713/184 |
| 2003/0051140 A1 | 3/2003 | Buddhikot et al. | 713/169 |
| 2003/0078072 A1 | 4/2003 | Serceki et al. | 455/557 |
| 2003/0081774 A1 | 5/2003 | Lin et al. | 380/44 |
| 2003/0117985 A1 | 6/2003 | Fujii et al. | 370/338 |
| 2003/0149666 A1* | 8/2003 | Davies | 705/50 |
| 2003/0149874 A1 | 8/2003 | Balfanz et al. | 713/168 |
| 2004/0088548 A1 | 5/2004 | Smetters et al. | 713/175 |
| 2004/0103280 A1 | 5/2004 | Balfanz et al. | 713/169 |

OTHER PUBLICATIONS

U.S. Appl. No. 10/231,194 entitled "Apparatus and Methods for Providing Secured Communication" to Dirk Balfanz et al., filed Aug. 30, 2002.

U.S. Appl. No. 10/424,191 entitled "System and Method for Establishing Secondary Channels" to Conley et al.

U.S. Appl. No. 10/656,439 entitled "Method, Apparatus, and Program Product for Securely Presenting Situation Information" to Smetters et al.

U.S. Appl. No. 10/656,551 entitled "Method, Apparatus, and Program Product for Provisioning Secure Wireless Sensors" to Smetters et al.

Asokan, N. et al.: "Key agreement in ad hoc networks", Computer Communications, Elsevier Science Publishers BV, Amsterdam, NL, vol. 23, No. 17, Nov. 1, 2000, pp. 1627-1637.

Balfanz, D. et al., "Talking To Strangers: Authentication in Ad-Hoc Wireless Networks," Xerox Palo Alto Research Center, [Retrieved from the Internet at http://www.isoc.org/isoc/conferences/ndss/02/proceedings/papers/balfan.pdf on Feb. 18, 2003] (Posted on the Internet on Feb. 11, 2002).

Dridi, F.et al., "How to Implement Web-Based Groupware Systems Based on WebDAV," Published in Proc. of WETICE 99, IEEE 8th Intl. Workshops on Enabling Technologies: Infrastructure for Collaborative Enterprises, Stanford, CA, pp. 1-7 (1999).

Fielding, R. et al., "Web-Based Development of Complex Information Products," Communications of the ACM, vol. 41, No. 8, pp. 84-92 (1998).

Lopes, D. et al., "Aerial Acoustic Communication," IEEE Workshop on Applications of Signal Processing to Audio and Acoustics, pp. 21-24, (2001).

Schneier, Bruce: "Applied Cryptography: Protocols, Algorithms, and Source Code in C" 1996, John Wiley & Sons, New York, US, Section 8.3 "Transferring Keys".

Stajano, F. and Anderson, R.: "The Resurrecting Duckling: Security Issues for Ad-Hoc Wireless Networks" 1999, AT&T Software Symposium, 'Online!' Sep. 15, 1999.

Whitehead, Jr., E. et al., "WebDAV, A Network Protocol for Remote Collaborative Authoring on the Web," pp. 1-21 (1999) (Retrieved from the Internet at http://citeseer.nj.nec.com/whitehead99webdav.html on Mar. 11, 2003).

Whitehead, Jr., E. et al., "Lessons from WebDAV for the Next Generation Web Infrastructure," Department of Information and Computer Science, University of California [Retrieved from the Internet at http://www.ics.uci.edu/~ejw/http-future/Whitehead/http_pos_paper.html on Sep. 20, 2002].

Bardram, Jakob E. et al. "Context-Aware User Authentication-Supporting Proximity-Based Login in Pervasive Computing", A.K. Dey et al. (Eds.): UbiComp 2003, LNCS 2864, pp. 107-123, 2003.

Geer, Daniel E. et al. "Token-Mediated Certification and Electronic Commerce", Proceedings of the Second USENIX Workshop on Electronic Commerce, Oakland, California, Nov. 1996.

Kindberg, Tim and Zhang, Kan "Secure Spontaneous Device Association", A.K. Dey et al. (Eds.): UbiComp 2003, LNCS 2864, pp. 124-131, 2003.

Kindberg, Tim and Zhang, Kan "Validating and Securing Spontaneous Associations between Wireless Devices" HP Laboratories, Palo Alto, HPL-2002-256, Hewlett-Packard Company, Sep. 12, 2002.

"ACC: Automatic Cryptographic Configuration of Embedded Devices" XML Trust Center White Paper 19th Feb. 2002, http://research.verisign.com/Papers/ACC1.html.

* cited by examiner

METHOD AND APPARATUS FOR USING A SECURE CREDENTIAL INFRASTRUCTURE TO ACCESS VEHICLE COMPONENTS

RELATED APPLICATIONS

This application claims benefit of U.S. Provisional Patent Application 60/527,938 filed Dec. 8, 2003 with inventors Paul J. Stewart, Diana K. Smetters, Rebecca E. Grinter, Dirk Balfanz, Glenn E. Durfee, and Hao-Chi Wong hereby incorporated by reference in its entirety herein.

This application is related to:

U.S. Provisional Patent Application 60/480,909 filed Jun. 24, 2003, entitled "Method And Apparatus For Establishing And Using A Secure Credential Infrastructure" with inventors Smetters, Balfanz, Durfee, Grinter, Stewart, and Wong hereby incorporated by reference in its entirety herein.

U.S. patent application Ser. No. 10/066,699 entitled "Systems And Methods For Authenticating Communications In A Network Medium" filed Feb. 6, 2002 with inventors Balfanz, Lopes, Smetters, Stewart, and Wong.

BACKGROUND

1. Field

Embodiments of this invention relate to the field of cryptography.

2. Background

Adoption of public key cryptography has been tremendously limited by the "key management problem" that is, the problem of allowing users to reliably identify the public keys of their intended communication partners. One approach used to address this problem is to construct a Public Key Infrastructure (PKI). This approach designates one or more trusted public keys known by the members of the PKI. The computer system that has the trusted public keys can sign digital certificates containing the public keys of users and devices in the PKI. This process authenticates the public keys of the PKI members.

The primary difficulty addressed by PKI is the problem of key management and distribution. That is, of deciding how to get authenticated copies of particular individuals' or devices' public keys to those individuals and devices that need to rely on these keys. A PKI is a system of well-known trusted public keys, possibly hierarchically organized. In PKI the owner of a trusted-key is usually termed a "Certification Authority", or CA. Those trusted keys are used to authenticate the keys of other members (users and devices) in the PKI by signing the keys for the members, thus creating a "digital certificate". Such a certificate typically uses this trusted signature to link a public key to information indicating who owns the key (an identity certificate), or what the key is allowed to be used for (an attribute certificate), or at very minimum, just that the bearer of the corresponding private key is a valid member of this particular PKI or other trust system.

Such a PKI simplifies the key management problem, as the number of keys that must be exchanged a priori goes from many down to the number of the trusted public keys. As long as the information contained in a member's certificate is sufficient to indicate to the verifier of that certificate that they are communicating with their intended party, the signature on that certificate is enough to let them know that the public key contained therein belongs to a trusted entity.

Unfortunately, creation and management of PKIs, as well as distribution of certificates, has turned out to be incredibly difficult and complex. Even establishment of small special-purpose PKIs to support the use of public key cryptography for one application within one organization is generally considered to be too expensive and difficult. One reason for this is that the available software is complicated, expensive, and requires deep knowledge of standards and cryptography to be configured to be effective. As a result, in spite of the fact that the use of public key cryptography can dramatically increase the security of many communications protocols (as compared, for example, to password-based alternatives), protocol designers are forced to move to less secure alternatives that do not require the "burden" of PKI establishment. Similarly, this cost of setting up a PKI keeps individuals from considering larger-scale use of public key cryptography in embedded devices (e.g. cell phones, printers, etc), as each of these devices would have to be "provisioned" with a certificate before use.

Furthermore, the key management and distribution problem described above in the PKI context exists with any secure credential infrastructure that has a credential issuing authority to issue credentials.

A derivative problem exists for wireless networks. These networks have proved notoriously difficult for even knowledgeable corporate IT departments to configure securely. This has led to many deployed networks exposing information and network resources to strangers thus, leaving client machines vulnerable to attack. While standards bodies have begun to specify technologies capable of securing these networks, these new security technologies are complex, and even more difficult to configure and manage than the existing technologies. In many environments (for example home, small business, or mobile wireless networks), it will be difficult, if not impossible, for network users to effectively configure and manage these networks to make them secure (many current wireless users find that 802.11b WEP is difficult to configure).

The standards body responsible for improving the security of the 802.11 standard are adapting the 802.1x standard for use on 802.11 networks.

In 802.1X's most secure configuration, clients and authentication servers authenticate each other and secure their communications using Transport Layer Security (TLS), which requires both the client and server to have a digital certificate with which they authenticate to each other. To distribute such certificates requires the deployment of a PKI (or other secure credential infrastructure) and the installation of a unique client certificate on each network client. This is a notoriously difficult task and subject to incorrect configurations that can leave clients vulnerable to rogue machines who can gain access to the shared wireless medium; those rogue machines can then use those vulnerable (but authenticated) clients as a base from which to attack the corporate LAN. Again, in situations where this approach is successful, it is either difficult to configure and manage, expensive, or totally out of the reach of small network users.

Another problem with ubiquitous computing environments within or around a vehicle or transportation infrastructure is that wireless communication of private data from a person's device to the vehicle or transportation infrastructure is difficult to establish securely. Another problem is that access to infrastructure and services is generally associated with the vehicle instead of the operator of the vehicle (for example, GM's OnStar™ system or automated toll payment systems).

It would be advantageous to use a secure credential infrastructure such as a PKI with the transportation infrastructure and private and public vehicles to provide secure wireless communication with the vehicle's components and to provide secure communications from the vehicle to associated infrastructure. It would also be advantageous to associate with an operator of the vehicle information and services that currently are associated with the vehicle itself.

DESCRIPTION OF THE PREFERRED EMBODIMENTS

One aspect of the embodiments disclosed herein is technology for creating a simple-to-use secure credential infrastructure. Such an infrastructure could be, for example, an "Instant PKI". That is, a PKI that is simple to establish, configure and use without diminishing the security provided by the PKI.

Another aspect is technology for automatically provisioning a vehicle for secure communications.

Figure 1:
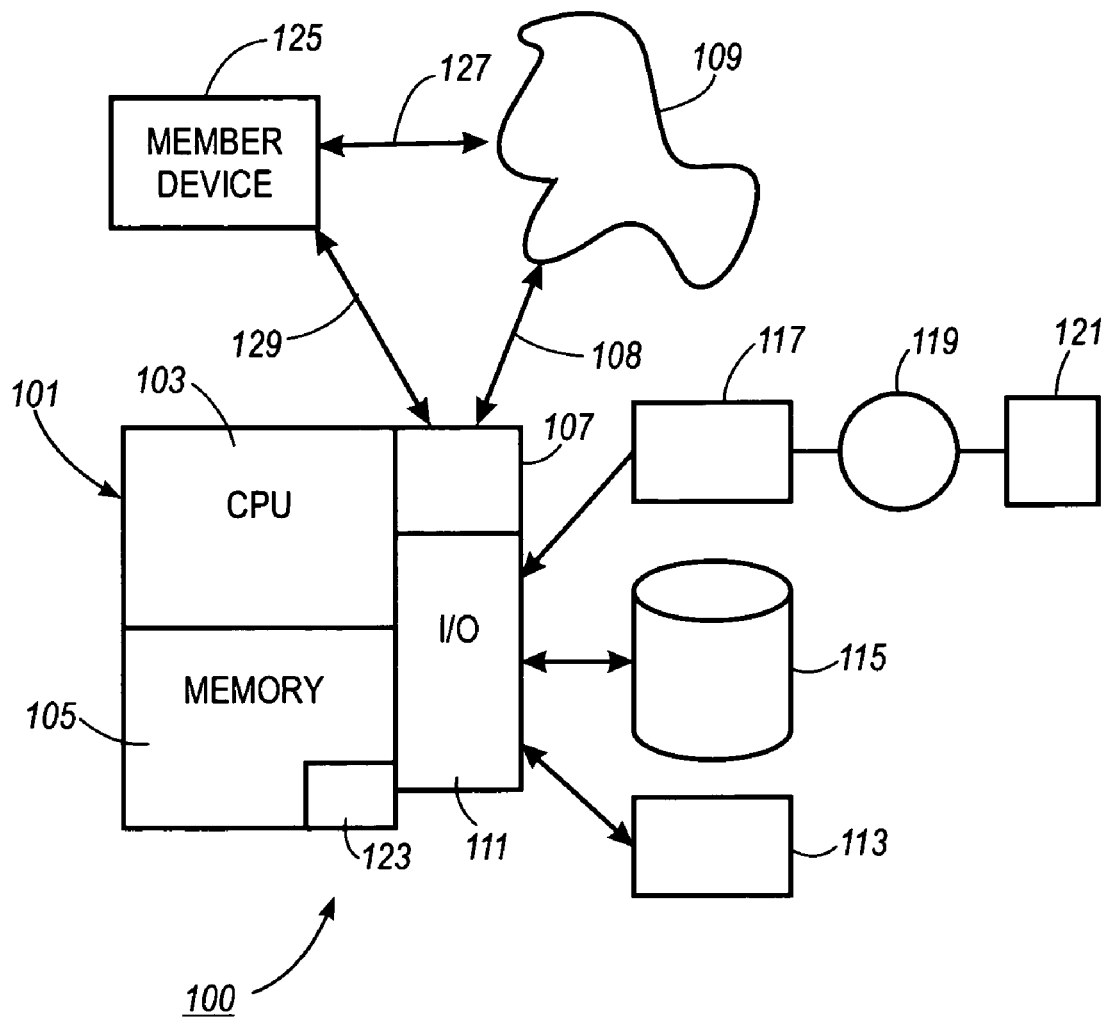
FIG. 1 illustrates a networked computer system in accordance with one embodiment.

FIG. 1 illustrates a networked computer system 100 that incorporates one embodiment of the invention. The networked computer system 100 includes a computer 101 that incorporates a CPU 103, a memory 105, and a network interface 107. The network interface 107 provides the computer 101 with access to a network 109 over a network connection 108. The computer 101 also includes an I/O interface 111 that can be connected to a user interface device(s) 113, a storage system 115, and a removable-media data device 117. The removable-media data device 117 can read a computer readable media 119 that typically contains a program product 121. The storage system 115 (along with the removable media data device 117) and the computer readable media 119 comprise a file storage mechanism. The program product 121 on the computer readable media 119 is generally read into the memory 105 as a program 123. One skilled in the art will understand that a device in communication with the computer 101 can also be connected to the network 109 through the network interface 107 using the computer 101.

A member device 125 can also communicate over the network 109 over a network connection 127. The member device 125 can also communicate with the computer 101 over a preferred channel 129 through the network interface 107 or the I/O interface 111 (not shown).

One skilled in the art will understand that not all of the displayed features of the networked computer system 100 nor the computer 101 need to be present for all embodiments of the invention. Further, such a one will understand that the networked computer system 100 can be a networked appliance or device and need not include a general-purpose computer. The network connection 127, the network connection 108, and the preferred channel 129 can include both wired and wireless communication. In addition, such a one will understand that the user interface device(s) 113 can be virtual devices that instead of interfacing to the I/O interface 111, interface across the network interface 107.

Further, one skilled in the art will understand that a procedure can be a self-consistent sequence of computerized steps that lead to a desired result. These steps can be defined by one or more computer instructions. These steps can be performed by a computer executing the instructions that define the steps. Thus, the term "procedure" can refer (for example, but without limitation) to a sequence of instructions, a sequence of instructions organized within a programmed-procedure or programmed-function, or a sequence of instructions organized within programmed-processes executing in one or more computers. Such a procedure can also be implemented directly in circuitry that performs the steps. Further, computer-controlled methods can be performed by a computer executing an appropriate program(s), by special purpose hardware designed to perform the steps of the method, or any combination thereof.

One embodiment is directed to the construction of a secure credential infrastructure. Such secure credential infrastructures include wired and wireless networks that use keys (for example, secret keys, or public-private key pairs) to encrypt information sent over a network such that the data representing the encrypted information only carries meaning to those computers that have the correct key, or a credential infrastructure that allows devices to use credentials to authenticate to other members, or to use credentials to authenticate to other members or service providers (for example, logging onto a Windows domain using a smart card that has a credential stored within it). This embodiment applies to secure credential infrastructures such as a public key infrastructure, to wireless networks (for example those using WEP encryption, or other wireless encryption standard), to wired networks, and to hybrid networks. One embodiment of the invention can be used to add target devices to a public key infrastructure (PKI) and thus, construct a PKI having member devices. Although much of the following is directed towards a secure credential infrastructure, one skilled in the art will understand that the inventive aspects apply as well to a PKI.

Figure 2:
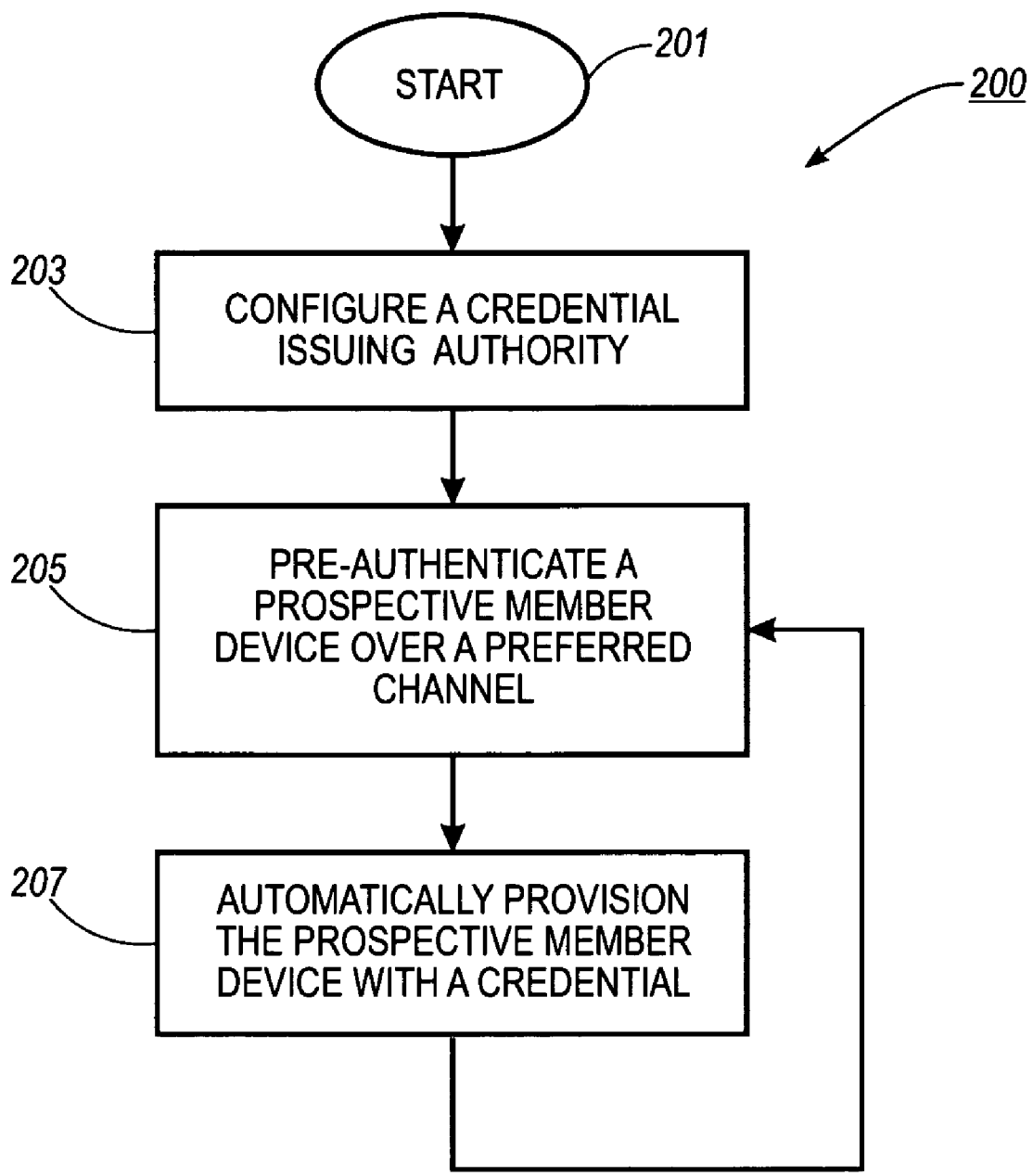
FIG. 2 illustrates a secure credential infrastructure construction process in accordance with one embodiment.

FIG. 2 illustrates a 'secure credential infrastructure construction' process 200 that is invoked when power is first applied to a credential issuing device, or when the credential issuing device is reset. The 'secure credential infrastructure construction' process 200 initiates at a 'start' terminal 201 and continues to a 'credential issuing authority configuration' procedure 203 that configures a credential issuing authority (for example a certification authority for a PKI) as is subsequently described with respect to FIG. 3.

Once the certification authority is configured, the 'secure credential infrastructure construction' process 200 continues to a 'prospective member device pre-authentication' procedure 205 that detects when a prospective member device is available to communicate to the credential issuing device over a preferred channel, optionally provides network configuration information to the prospective member device to enable it to communicate with the credential issuing device over some network other than the preferred channel, and pre-authenticates the prospective member device. The 'prospective member device pre-authentication' procedure 205 is subsequently described with respect to FIG. 4.

Once the prospective member device is pre-authenticated, an 'automatically provision prospective member device with credential' procedure 207 provisions the prospective member device by providing the prospective member device with a credential (in the PKI case, a public key certificate) for the prospective member device as well as the credential issuing device's public key certificate and any other information that is requested by the prospective member device, or automatically provided by the or enrollment station. Once provisioned, the prospective member device becomes a member device of the secure credential infrastructure. The 'automatically provision prospective member device with credential' procedure 207 is subsequently described with respect to FIG. 6.

The 'secure credential infrastructure construction' process 200 repeats back to the 'prospective member device pre-authentication' procedure 205 for each prospective member device to be added to the secure credential infrastructure.

A credential can include a X.509 certificate, a WTLS certificate, a SPKI certificate, an attribute certificate, or any other association of a key or secret with trust, access, or identity.

Once the prospective member device is provisioned it becomes a member device and can use its credential as is known in the art. This includes using the credential to enable secure communications across a network, to use credential to provide access to devices, networks, services, containers, office space, or other device, area, or service that requires authentication and/or authorization or a credential to access.

Any device that performs the 'secure credential infrastructure construction' process 200 as well as any device that performs provisioning services for other secure networks is contemplated as a credential issuing device. Often, the credential issuing device includes a credential issuing authority (in the context of a PKI, a certification authority (CA)). One skilled in the art will understand that a public key infrastructure is but one instance of a secure credential infrastructure that includes a credential issuing authority (such as a certification authority) that provides a credential (such as a public key certificate) through a credential issuing device to the prospective member device. Possession of the credential by the prospective member device makes the device a member device of the secure credential infrastructure. Possession of the credential provides the member device with the ability to authenticate and/or authorize, or to access.

The preferred channel can be a location-limited channel or any other channel that has both a demonstrative identification property and an authenticity property.

The demonstrative identification property requires that identification be based on a physical context (for example but without limitation, "the printer in front of me," "all PDA's in the room," or "this device that I am touching"). The preferred channel uses communication technologies that have inherent physical limitations on their transmissions. Examples (but without limitation) of such technologies include visible or invisible electromagnetic radiation communication such as infrared communications, communications through a short run of wires, audio (both audible, and inaudible (for example ultrasonic)), communication by passing information from one device to another device using a physical computer-readable media (such as a removable media or drive (for example, a floppy disk, a removable disk, a USB storage device (such as a flash memory pen or disk drive) or other tangible data carrier)), physical electrical contact, near-field signaling across the body, and short range RF, as well as embodiments that require an operator to enter a code (other examples can be found in the discussion with respect to FIG. 8). The demonstrative identification property of the preferred channel means that human operators are aware of which devices are communicating with each other over the preferred channel and that the human operators can easily detect when an attack is being made on the preferred channel. The telephone system can be another location-limited channel (although somewhat less trusted as one cannot easily detect wiretaps and other intercepts).

The authenticity property of the preferred channel means that it is impossible or difficult for an attacker to transmit over the preferred channel or tamper with messages sent over the preferred channel without detection by the legitimate parties to the communication.

The preferred channel does not require secrecy (that is, an attacker can monitor the transmissions on the preferred channel) so long as the attacker cannot transmit on the preferred channel without detection. Because of the location-limited nature of the preferred channel, it is difficult for an attacker to monitor the channel, let alone transmit on the channel without detection. Further, detection only requires that the human participants know the number of the participants (devices) who are communicating over the preferred channel.

As is subsequently described, the use of the preferred channel to pre-authenticate the participants' keys allows the administrator of the secure credential infrastructure to be assured that the keys are only provided to prospective member devices that have access to the preferred channel. Thus, establishing "trust" because the user of the prospective member device must have had physical access to the preferred channel (for example, when the user is an employee and has had access to the building where the preferred channel is located).

During the pre-authentication process, commitments (commitments are subsequently described) to each participant's public keys are exchanged over the preferred channel. Once the commitments are exchanged, the devices can perform a key exchange protocol or procedure and establish further secure communication using any method known in the art. To illustrate, once a key is received, it is verified by checking that the received key matches the commitment that was provided via the preferred channel. Once the keys are verified, well-known techniques can be used to commence communication using the keys (and in addition, in the case of a public key, also verifying that the other device holds the private key corresponding to the provided public key). Once the public keys are verified and the provider of the public key proves possession of the private key that corresponds to the public key, the credential issuing authority can provide a credential to the prospective member device for its use such that the prospective member device becomes an actual member device of the PKI.

A commitment to a piece of information X is a piece of information C that can be verified to match X. A commitment is "binding," when it is cryptographically difficult for an attacker, even knowing X and C, to produce a different piece of information Y that C will also match.

A commitment is "hiding" when it cryptographically difficult for an attacker knowing C to extract even partial information about X.

An example of a binding and hiding commitment to X can be H(X) where H can be a cryptographically secure hash function. One skilled in the art will understand from the context whether the commitment used needs to be binding, hiding, or both.

A commitment can be used to establish trust if it is received over a preferred channel or endowed with a digital signature from a party the recipient trusts. A trusted commitment allows the level of trust of a matching piece of information (possibly received over an untrusted channel, or unsigned) to be elevated to the same level of trust as the commitment.

Figure 3:
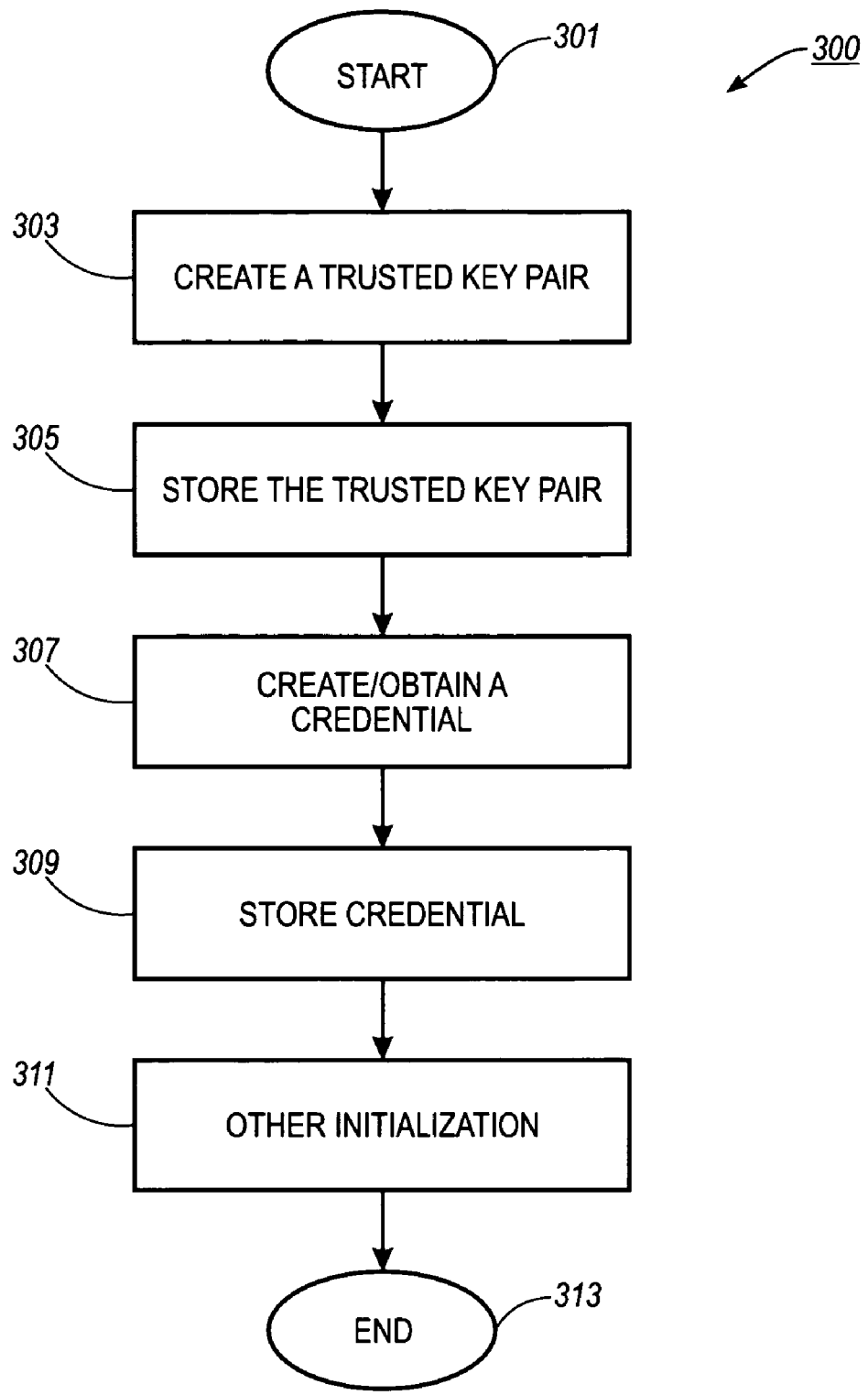
FIG. 3 illustrates a credential issuing authority configuration process in accordance with one embodiment.

FIG. 3 illustrates a 'credential issuing authority configuration' process 300 that can be used by the 'credential issuing authority configuration' procedure 203 of FIG. 2. This process can be used to initialize the credential issuing device so that it has a trusted credential. The 'credential issuing authority configuration' process 300 initiates at a 'start' terminal 301 and continues to a 'create trusted key pair' procedure 303 that generates public and private keys using well-known techniques. Once the trusted key pair is generated, a 'store trusted key pair' procedure 305 stores the trusted key pair on a storage device (for example, but without limitation, a disk, a cryptographic token, network device, network storage, memory card, etc.). Once the trusted key pair is generated, the 'credential issuing authority configuration' process 300 continues to a 'create issuing authority credential' procedure 307. One skilled in the art will understand that there are other types of credential systems other than certification systems that can be provisioned as described herein.

The 'create issuing authority credential' procedure 307 can create a self-signed credential (a "root" credential). The 'create issuing authority credential' procedure 307 can also access a parent certification authority to obtain a chained credential and to import the chained credential back to the credential issuing device. Once the credential is created or obtained, a 'store issuing authority credential' procedure 309 stores the credential in some available storage for subsequent use.

Other services or features can be initialized by an 'other initialization' procedure 311. These services and/or features can include directory services, generation of certificate revocation lists (CRLs) or credential status processing as well as other services. In addition, these services can include, for example, key-pair generation services, 802.11a/b/g provisioning services, network address provisioning services etc. The 'credential issuing authority configuration' process 300 completes through an 'end' terminal 313.

Figure 4:
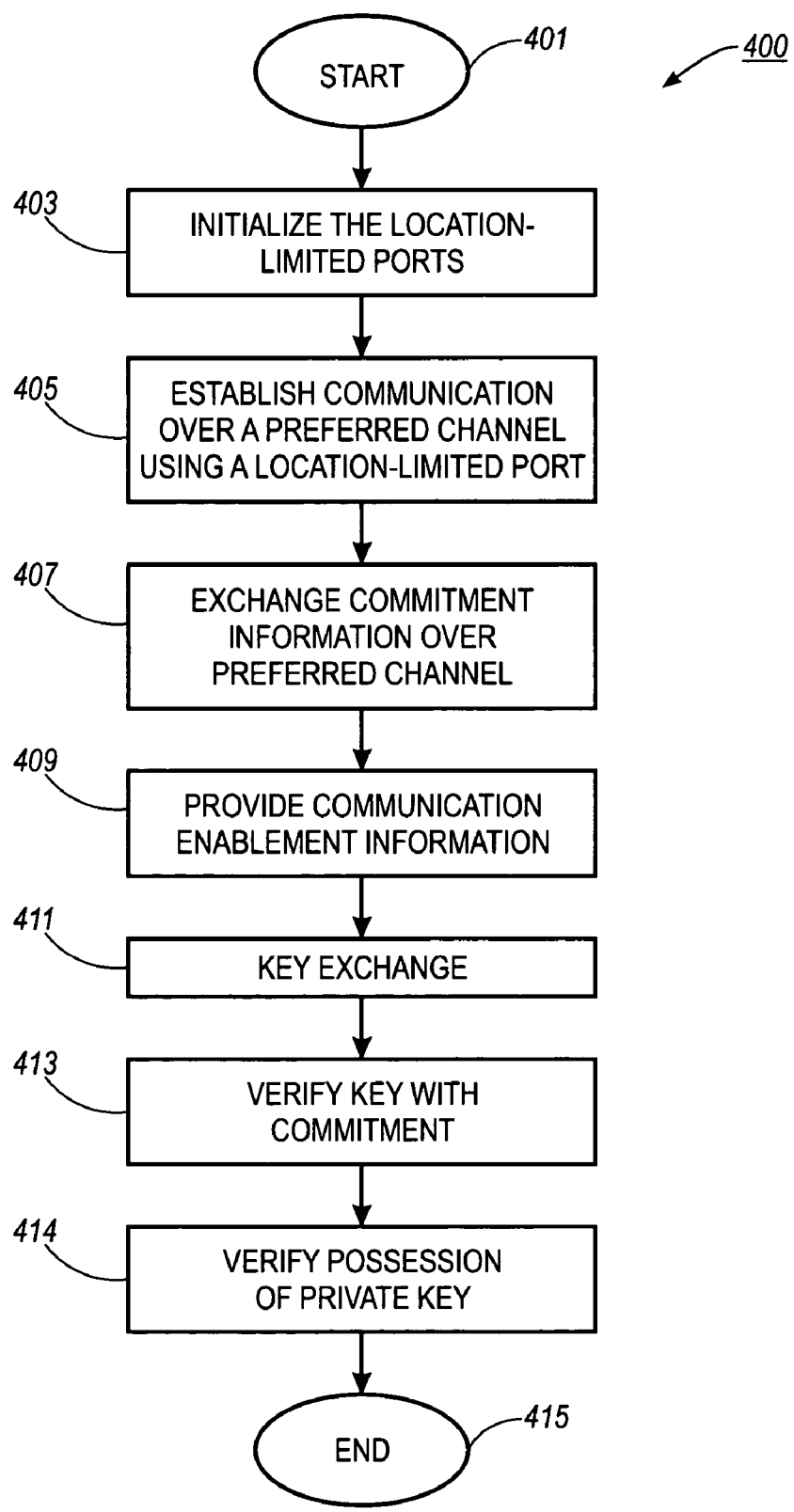
FIG. 4 illustrates a process that can be used by a credential issuing device to pre-authenticate a prospective member device over a preferred channel in accordance with one embodiment.

FIG. 4 illustrates a pre-authentication process for a credential issuing device 400 that can be used by the 'prospective member device pre-authentication' procedure 205 of FIG. 2.

The pre-authentication process for a credential issuing device 400 can be used to establish trust between the credential issuing device and the prospective member device such that the prospective member device can be provisioned with a credential and become a member device of the secure credential infrastructure.

The pre-authentication process for a credential issuing device 400 initiates at a 'start' terminal 401 and continues to an 'initialize location-limited ports' procedure 403 that activates one or more I/O ports of the credential issuing device that will be used to establish a preferred channel with the prospective member device.

Figure 8:
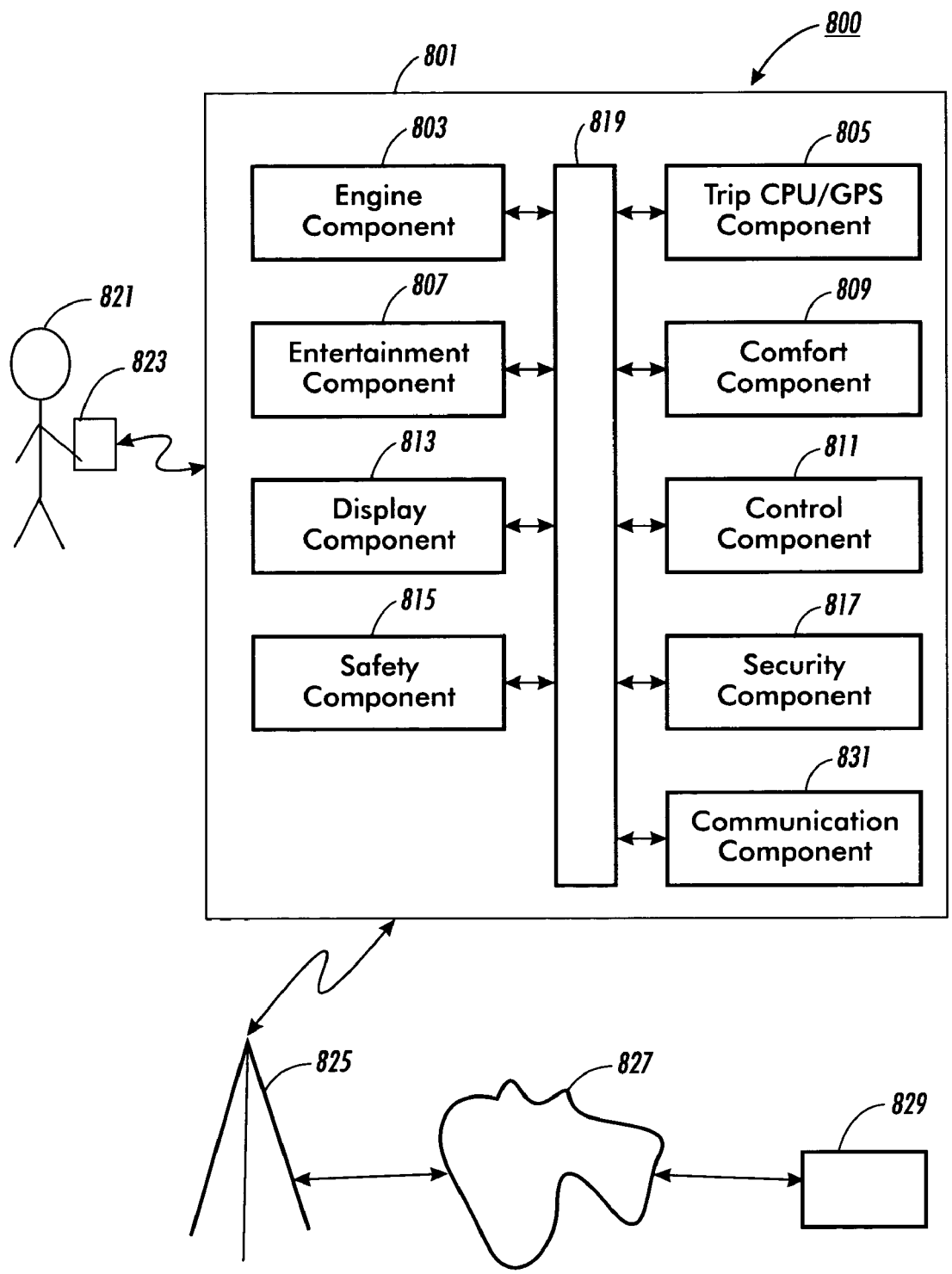
FIG. 8 illustrates a secure vehicle environment.

A preferred channel can be established using any location-limited communication mechanism such as those described with respect to FIG. 8. Once the preferred channel ports are initialized, the pre-authentication process for a credential issuing device 400 continues to an 'establish communication over preferred channel' procedure 405 that establishes communication over the preferred channel between the credential issuing device and the prospective member device using one of the location limited ports initialized by the 'initialize location-limited ports' procedure 403. Once communication is established between the prospective member device and the credential issuing device (for example by aligning IR ports on the devices), the pre-authentication process for a credential issuing device 400 continues to an 'exchange commitment information' procedure 407 that generates a commitment for the public key. The commitment will be sent to the prospective member device over the preferred channel. The commitment can be a portion of the public key, the public key itself, an encoding of the public key, a mathematical function of the public key or other function of the key generated by any commitment technique. The credential issuing device also receives a commitment from the prospective member device for the key or secret that the prospective member device will send to the credential issuing device.

Next a 'provide communication enablement information' procedure 409 can provide the prospective member device with network configuration information required for the credential issuing device to communicate to the prospective member device over the desired communication media (as compared to the preferred channel). For example, where the credential issuing device is a WAP, it could specify the SSID and possibly a wireless channel selection and/or a WEP key; for a wired network, the credential issuing device could specify a specific MAC address and/or static IP address. One skilled in the art will understand that the 'provide communication enablement information' procedure 409 is optional in many embodiments and that the prospective member device can be pre-configured for network communication. However, one advantage of the 'provide communication enablement information' procedure 409 is that it simplifies the network configuration process for the prospective member device. For example, but without limitation, the credential issuing device can automatically assign a fixed network address to the prospective member device (as compared to a DHCP address), specify a SSID, specify a WEP key, a domain name, an IP address, a VPN address, gateway address, Bluetooth address, security settings, security policies, bit lengths, or other information needed to establish communication between the credential issuing device and the prospective member device over a channel other than the preferred channel. In addition, other information can be provided beyond just network configuration information. Furthermore, the communication enablement information can be used to bootstrap a secure communication channel that can be used to further provision the prospective member device, for example as is subsequently described with respect to FIG. 6. In addition, similar information can be provided during subsequent provisioning using a secure channel.

Once the commitments are exchanged, an 'key exchange' procedure 411 exchanges keys (for example using any key-exchange protocol known in the art) such that the credential issuing device and the prospective member device will be able to perform communication over a network that is not the preferred channel. The 'key exchange' procedure 411 need not use the preferred channel or an encrypted data path to exchange public keys. However, if secret keys are being exchanged secure communication are required (such as using the committed-to keys to establish secure communication over a non-preferred network; and using the established secure communication channel to negotiate exchange of a secret key). Furthermore, the preferred channel can be used with the 'key exchange' procedure 411 so long as any secret data is encrypted (and preferably using a protocol such as SSL). This can be useful where the preferred channel has sufficient bandwidth to timely carry the protocol.

Once the keys are exchanged, a 'verify keys with commitment' procedure 413 verifies that the received key matches the commitment (this can be done both by the credential issuing device and the prospective member device with the commitments and keys they have received respectively). For example, verifying that a received key matches a commitment can be performed by computing a cryptographic hash of the key and verifying that this hash is equal to the commitment. Once the public keys are verified by the commitment information, a 'verify possession of private key' procedure 414 establishes proof that the device providing the verified public key also has possession of the corresponding private key (for example using a key-pair validation mechanism that uses techniques well known in the art). Finally, the pre-authentication process for a credential issuing device 400 completes through an 'end' terminal 415.

In one embodiment of the invention, the actual key can be provided as the commitment. Then when keys are exchanged, verifying that the received key matches the previously received commitment can be done simply by verifying that they are equal.

Figure 5:
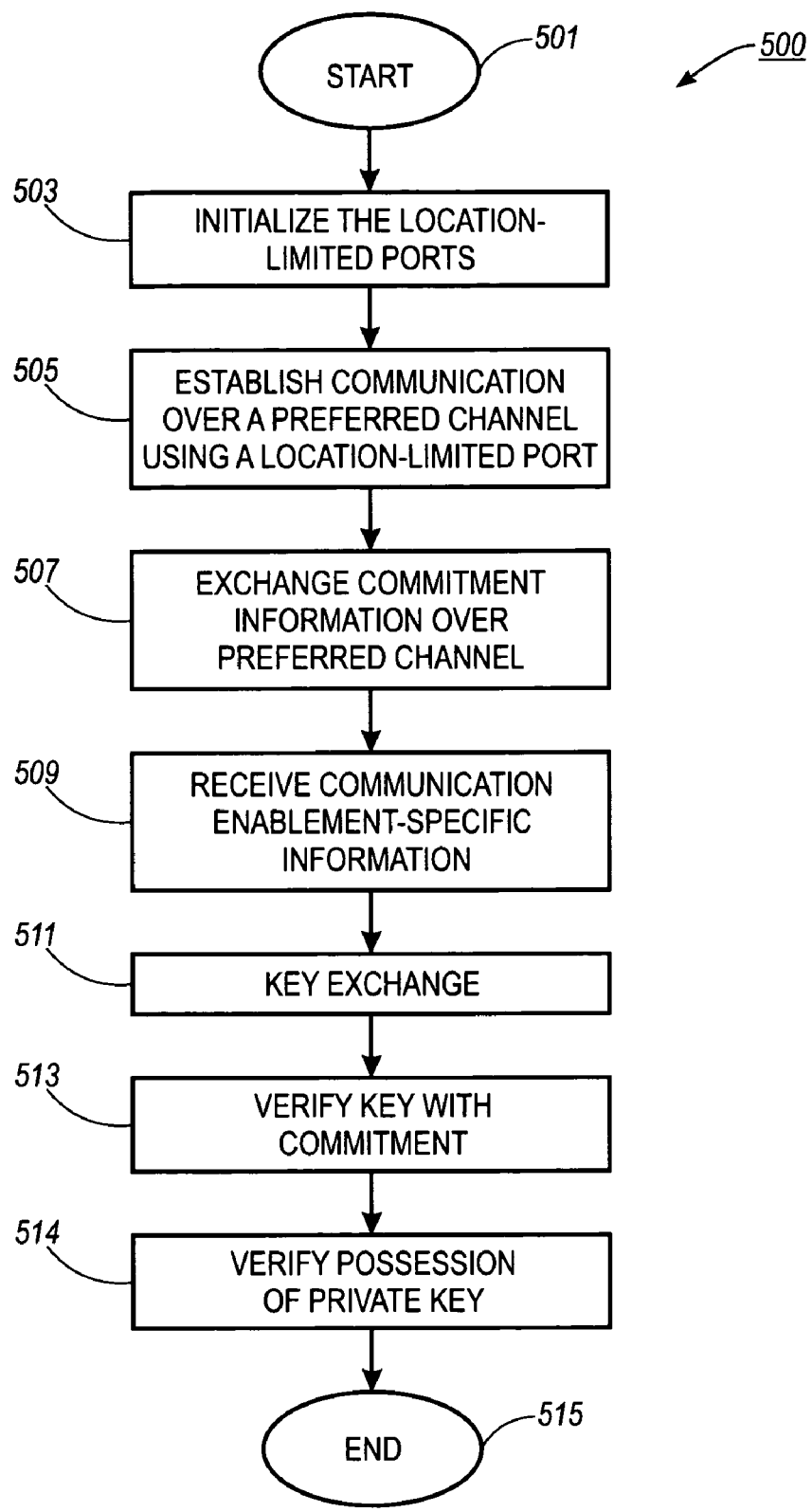
FIG. 5 illustrates a process that can be used by a prospective member device to pre-authenticate a credential issuing device over a preferred channel in accordance with one embodiment.

FIG. 5 illustrates a pre-authentication process for a prospective member device 500 that is very similar to the pre-authentication process for a credential issuing device 400 of FIG. 4. The pre-authentication process for a prospective member device 500 includes a 'start' terminal 501, an 'initialize location-limited ports' procedure 503, an 'establish communication over a preferred channel' procedure 505, an 'exchange commitment information' procedure 507, a 'receive communication enablement information' procedure 509, an 'key exchange' procedure 511, a 'verify keys with commitment' procedure 513, a 'verify possession of private key' procedure 514, and an 'end' terminal 515. These procedures are substantially the same as the corresponding procedure shown in FIG. 4 with the exception of the 'receive communication enablement information' procedure 509.

The 'receive communication enablement information' procedure 509 receives the information provided by the credential issuing device at the 'provide communication enablement information' procedure 409 and conditions the prospective member device so that it can communicate over one or more networks, or otherwise processes the communication enablement-specific information as appropriate.

With regards to the 'establish communication over preferred channel' procedure 405 and the 'establish communication over a preferred channel' procedure 505, there are at least two modes for establishing communication over the preferred channel. These modes differ in how the communication is established. In a first mode, the prospective member device can explicitly initiate the connection to the credential issuing device over the preferred channel and request a credential (either as part of an initial auto-configuration of the client, in request to stimuli from the environment—for example, detection of a new wireless network—, as a result of input from the user, or by an automated discovery process). This can be accomplished by having the prospective member device initiate the exchange of credentials with the designated the credential issuing device. One example of establishing a preferred channel is by aligning infrared or visible light ports of the prospective member device and the credential issuing device. Additional examples of connection examples are subsequently described with respect to FIG. 8.

Designation of the credential issuing device can be explicit (for example, "this device to which I have established an electrical connection", "this device I touch," "this device that is aligned with a specific IR port,") or implicit (for example, "any device that can receive audible signals issued from my device").

In the second mode, the communication over the preferred channel can be initiated by the credential issuing device in response to an action such as a user placing the prospective member device in a cradle attached to the credential issuing device by a serial port, or USB port or by having the prospective member device respond to a credential-granting token associated with the secure credential infrastructure. Using this approach, the prospective member device generally can be configured to be able to accept the pre-authentication requests from the credential issuing device. The prospective member device in this configuration, for example, can be executing an application that receives credentials and determines and processes the received credentials. In another example, the prospective member device can support a background program (for example, a UNIX daemon) that receives the credential and makes it available to other registered applications (with optional user confirmation or other feedback). Note that the cradle should not be a wireless cradle (that is, a cradle that wirelessly sends information to the credential issuing device) unless the communication between the cradle and the credential issuing device is secure.

A credential-granting token can include portable credential issuing devices (like a JAVA card), smart cards that can create credentials and directly provision prospective member devices. Other devices can, for example, serve as storage devices for accumulating and storing commitments between a group of prospective member devices that are to belong to a secure credential infrastructure. Finally, the credential issuing device can require identification of a key to enable the credential issuing function of the credential issuing device (for example, such a key can be a USB storage or biometric sensor that must be accessed prior to the credential issuing device provisioning a credential).

One skilled in the art will understand that the commitment to the key is transferred over the preferred channel because the preferred channel is assumed to be resistant to undetected active attacks and to thereby endow data transferred across it with the authenticity property. A channel does not need to be resistant to eavesdroppers to be used as a preferred channel because only public information (e.g. a public key, or a commitment to a public key) is sent over that channel; a pair of devices authenticating themselves to each other by sending such key or commitment information over the preferred channel are able to set up a secure communication with each other because they can demonstrate possession of the private keys corresponding to the public keys committed to or exchanged over the preferred channel (using any technique known in the art, such as a key exchange protocol like SSL/TLS). An eavesdropper that detects the commitment or keys sent across the preferred channel is not able to demonstrate possession of the corresponding private key, and therefore is unable to affect communication between the legitimate parties. Further, one skilled in the art will understand that the preferred channel can be a very low bandwidth channel as only needs to carry the key commitment (and possibly essential communication parameters for the non-preferred channel—such as a LAN, or Internet). The provisioning of the credential and other information to the prospective member device can be accomplished using the non-preferred channel(s).

Example protocols for exchanging commitments follow:

Pre-authentication for two keys, taking place over the preferred channel:

1. A→B: $addr_A$, $h(PK_A)$
2. B→A: $addr_B$, $h(PK_B)$

Authentication continues over a non-preferred (wireless) channel with any standard key exchange protocol to exchange $PK_A$ and $PK_B$ to establish secure communications, e.g.:

1. A→B: TLS CLIENT HELLO
2. . . . and so on.

The various symbols denote:

$addr_A$, $addr_B$: A's (resp. B's) address in wireless space, provided strictly for convenience;

$PK_A$, $PK_B$: the public key belonging to A (resp. B), either a long-lived key or an ephemeral key used only in this exchange;

$h(PK_A)$: a commitment to $PK_A$. e.g., a one-way hash of an encoding of the key.

Pre-authentication for one key, taking place over the preferred channel:

1. A→B: $addr_A$, $h(PK_A)$
2. B→A: $addr_B$, $h(S_B)$

Authentication continues over a non-preferred (wireless) channel with any standard key exchange protocol to exchange $PK_A$ and a secret, e.g.:

1. A→B: $PK_A$
2. B→A: $E_{PKA}(S_B)$

Figure 6:
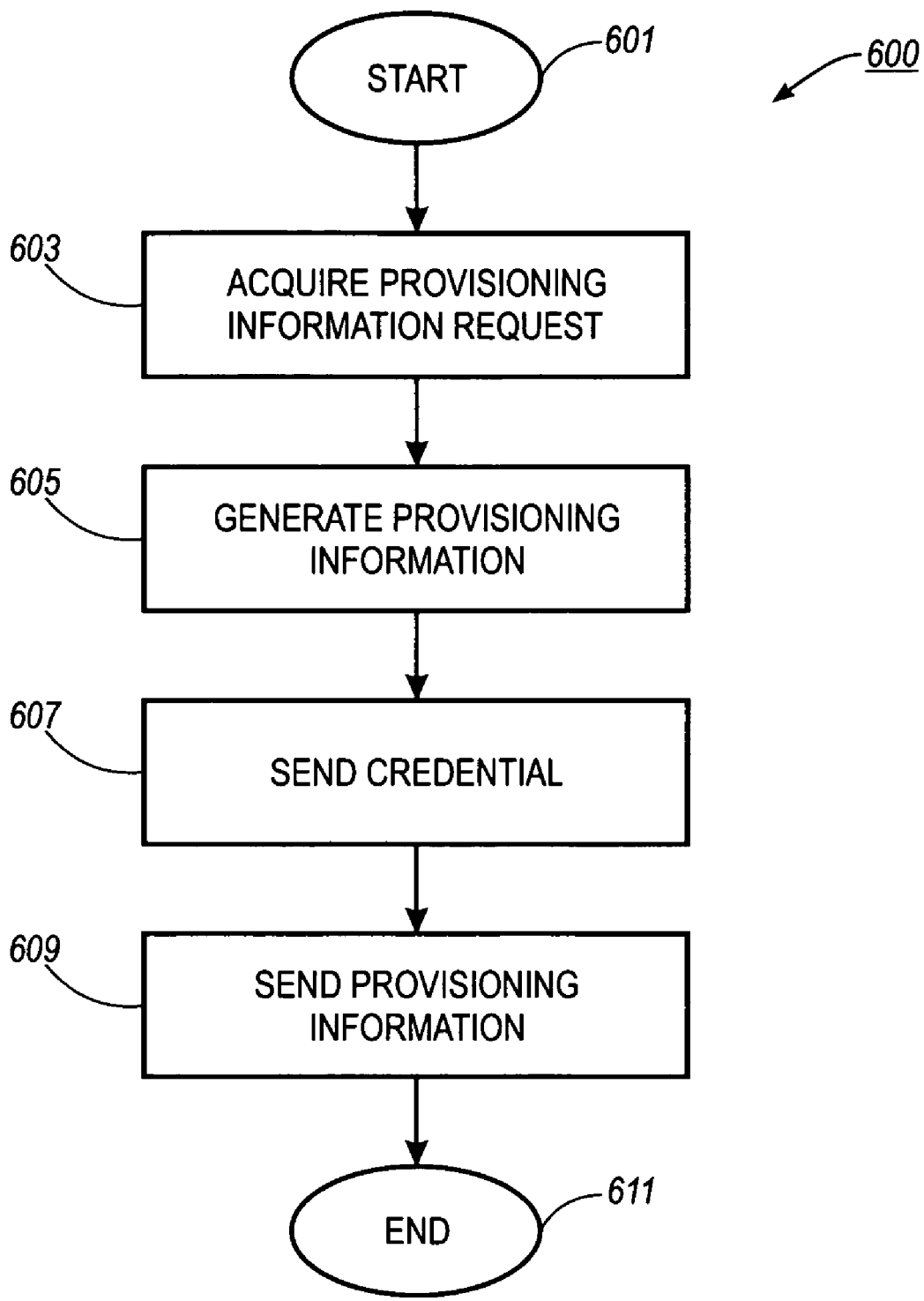
FIG. 6 illustrates an automatic prospective member device credential provisioning process in accordance with one embodiment.

The various symbols denote:

$addr_A$, $addr_B$: A's (resp. B's) address in wireless space, provided strictly for convenience;

$PK_A$: the public key belonging to A either a long-lived key or an ephemeral key used only in this exchange;

$S_B$: a secret belonging to B;

$h(PK_A)$: a commitment to $PK_A$ e.g., a one-way hash of an encoding of the key;

$h(S_B)$: a commitment to $S_B$ $E_{PKA}(S_B)$: the encryption of $S_B$ Under $PK_A$ FIG. 6 illustrates an automatic prospective member device credential provisioning process 600 that can be used by the 'automatically provision prospective member device with credential' procedure 207 of FIG. 2. The automatic prospective member device credential provisioning process 600 provisions the prospective member device with the credential. It also sends the prospective member device other provisioning information (for example, information requested by the prospective member device or that is automatically provided by the credential issuing device.

The automatic prospective member device credential provisioning process 600 initiates at a 'start' terminal 601 and continues to an 'acquire provisioning information request' procedure 603. The 'acquire provisioning information request' procedure 603 can receive a request for provisioning information from the prospective member device. In addition, the 'acquire provisioning information request' procedure 603 can detect a condition that triggers the credential issuing device to provide pre-determined or user selected provisioning information. The request can include requests for information or services beyond that of just providing a credential.

Once the credential issuing device acquires the request, a 'generate provisioning information' procedure 605 generates a credential (such as one or more public key certificates) and any other requested provisioning information. The 'generate provisioning information' procedure 605 can include requesting authorization for the credential from a registration agent (for example from an RA in a PKI).

A 'send credential' procedure 607 causes the credential issuing device to send one or more credentials to the prospective member device. Once the prospective member device receives the credential, it becomes a member device of the secure credential infrastructure. Also, a 'send provisioning information' procedure 609 sends the provisioning information from the credential issuing device to the prospective member device.

The prospective member device can also request that it be provisioned with a key-pair generated by a credential issuing device or any other information that may be available. One skilled in the art will understand that some embodiments can send provisioning information that is not requested by the prospective member device (for example, application specific information).

Furthermore, the prospective member device can be provisioned with information that can be used by the prospective member device to establish a Virtual Private Network (VPN) with some other member device, security gateway, etc.

One skilled in the art will understand that the 'automatically provision prospective member device with credential' procedure 207 in some embodiments will only provision the prospective member device with the credential, while other embodiments will provision the prospective member device with both the credential and other requested (or default) provisioning information (and in some embodiments may not provision a credential at all—see FIG. 10 and its discussion).

The provisioning information can be any information that can be used by the prospective member device. This information can include application specific information, site specific information, network specific information, or other information. This information can also include, for example but without limitation, information such as application-dependent information, device-specific assignment information (for example, in a hospital environment, the name of the patient, the case number, or other data-acquisition information required to capture data from the device or to cause the device to operate), database access information, cell phone provisioning information (such as the cell phone number), any kind of owner information, vehicle information, location information, information required to establish a secure communication link (for example VPN-related information), collaborative work space information, radio channel, any kind of application specific information, and information required to access a database. Thus, the term "provisioning" applies to the providing of a credential, as well as the providing of other information that can be used by a member device. In some embodiments, the provisioning information can be provided using multiple communication channels. In particular, the preferred channel can be used to send provisioning information to bootstrap subsequent communication (secure or not secured) over the preferred or non-preferred channel (for example, information necessary to establish temporary communication over a non-preferred channel). The two parties can then go on to exchange additional provisioning information over that non-preferred channel subsequent to the 'key exchange procedure' and 'key verification procedure' described above, which can be used to establish secure and authenticated communication between the parties over that non-preferred channel. This additional provisioning information can contain any of the provisioning information types described above, including communication enablement information sufficient to allow the new member device to communicate on another non-preferred network connection not used during the provisioning. In other embodiments, the preferred channel can be exclusively used to provision the prospective member device, possibly with the use of a key exchange protocol to additionally secure some of that communication. The more common embodiment will be where a first set of provisioning information is provided over the preferred channel, and other provisioning information is provided using a second (generally secure) communication channel.

Figure 7:
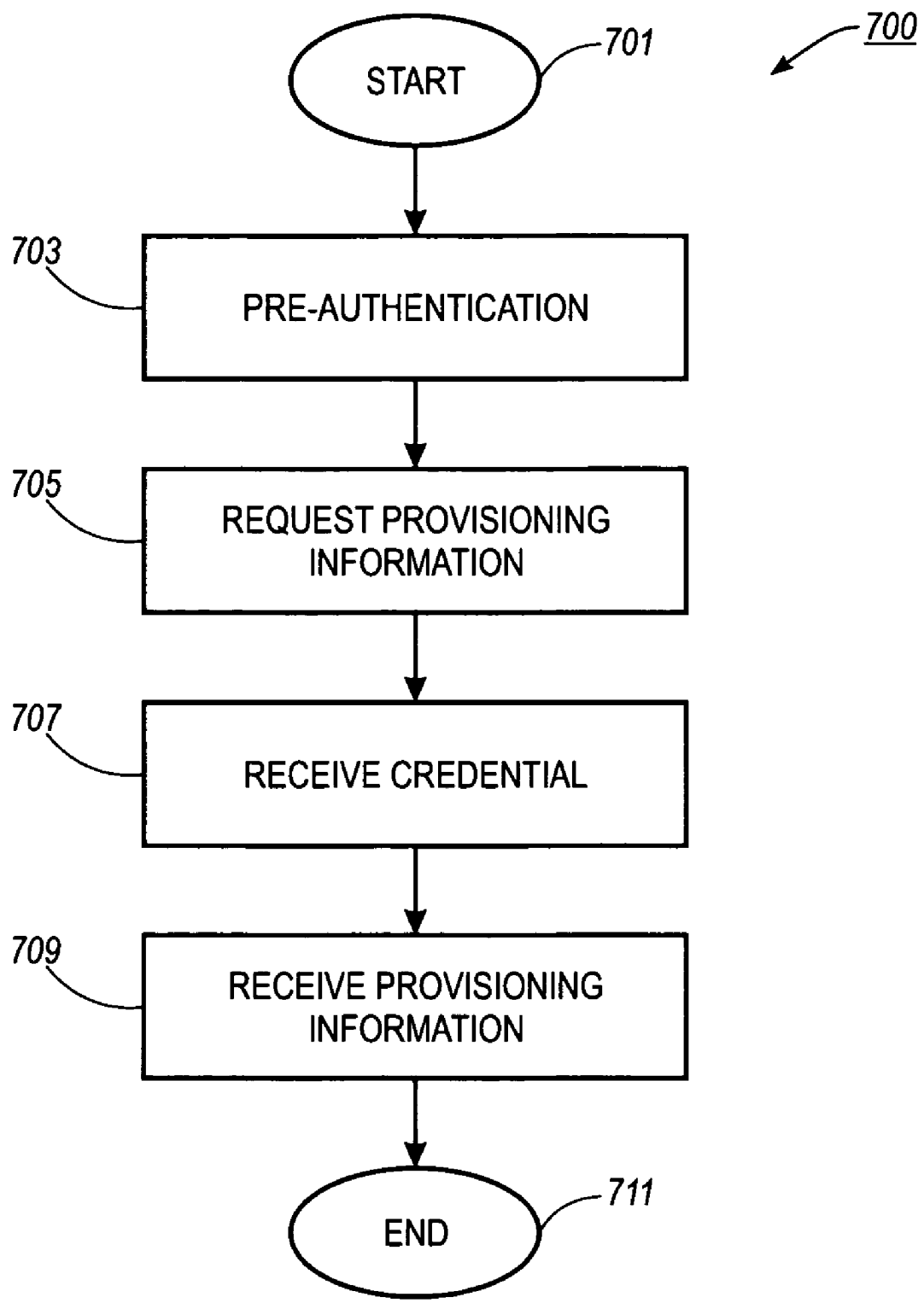
FIG. 7 illustrates one embodiment of the prospective member device provisioning process.

FIG. 7 illustrates a 'prospective member device-side provisioning' process 700 that can be used by the prospective member device to automatically receive a credential and other provisioning information from the credential issuing device. The 'prospective member device-side provisioning' process 700 initiates at a 'start' terminal 701 generally responsive to an event (for example, the detection of the potential for establishing a preferred channel, or in response to a user's action), and continues to a 'pre-authentication' procedure 703 (that invokes the pre-authentication process for a prospective member device 500 that has been previously described with respect to FIG. 5). Once the 'pre-authentication' procedure 703 completes, the prospective member device can communicate over a network. At a 'request provisioning information' procedure 705, the prospective member device sends a request for a credential and any other desired and available provisioning information. A 'receive credential' procedure 707 receives the credential and at a 'receive provisioning information' procedure 709 receives other requested provisioning information that was sent by the automatic prospective member device credential provisioning process 600. The received credential and possible other provisioning information can then be made available for use (whether by applications within the prospective member device, by readers of the prospective member device, or by other ways known in the art to use the credential). The 'prospective member device-side provisioning' process 700 completes through an 'end' terminal 711.

One skilled in the art will understand that some embodiments provision an IPSEC VPN instead of (or in addition to) 802.1X and EAP-TLS protocols on a wireless network (or for a wired network). Furthermore, other embodiments are envisioned that include a firewall and that automatically provision credentials to systems/users that allow the systems/users to communicate through the firewall. This can include allowing the system to connect over the VPN to the network protected by the firewall from the internet or wired or wireless LAN. Such a one will understand that some embodiments can be used to secure wireless LANs using techniques such a keyed hopping patterns, etc.

Modern vehicles heavily rely on computers. They are involved with monitoring and controlling the operation of the vehicle. Some of them respond to operator manipulations while other computers respond to environmental inputs. Still other computers are in the ancillary devices such as the radio or global positioning system. Other computers can be used as a trip computer or to drive a display. Many of the operator controls provide operator feedback to computers that actually perform the requested operation. Some vehicles use smart cards or smart keys to personalize the vehicle's seat, mirror, and steering wheel settings.

Another aspect of the modern world of 2003 is that many people carry personal computing devices. These personal computing devices include cell phones, personal digital assistants (PDAs), and portable computers.

While some of the computers in the vehicle communicate with each other, they have not communicated with the operator's computing equipment. Thus, an operator must manually setup his/her radio, seat position, and other personalized control options (at least once, some vehicles have memory systems that will allow the vehicle to remember previously-set options (such as seat position, temperature settings, and mirror settings). As many vehicle operators must drive multiple vehicles (for example rented cars), these settings must be continually set for the user.

Having the ability to easily construct a secure credential infrastructure, as has been previously described, enables new capabilities for vehicles, mobile communications, and the transportation infrastructure.

FIG. 8 illustrates a secure vehicle environment 800 that includes a vehicle 801. The vehicle 801 includes a number of components such as an engine component 803, a trip computer/global positioning component 805, an entertainment component 807, a comfort component 809, a control component 811, a display component 813, a safety component 815, and a security component 817. Many of these components include a computer. The computers in some of these components are in communication with computers of other of the components through a component communication system 819. Either directly through a wiring harness (either electrical or fiber optic), through a network (that can include an intra-vehicle wireless network), or by other means (for example, indirectly by situation sensors).

The secure vehicle environment 800 also includes an operator 821 of the vehicle 801 who has a key device 823 to obtain access to the vehicle 801 through the security component 817.

The secure vehicle environment 800 also includes a wireless communication network 825 such that a component or the operator 821 can communicate from the vehicle 801 to the outside world (for example, using a wireless communication network 825, or cell phone infrastructure). Some of these communications can traverse an Internet 827 to access a remote computer 829. In addition, in some embodiments, components of the vehicle 801 can communicate to the wireless communication network 825 using the mobile phone or other communication device of an occupant of the vehicle 801 as well as, or instead of, using of the vehicle 801. In addition, the vehicle 801 can include a mobile communication component 831 such as a cell phone or other mobile communication device.

One embodiment of the invention enables an operator to personalize a vehicle that has one or more computerized components. This personalization accomplished by providing personalization information to at least one of the computerized components. This is most conveniently done using a wireless transmission of the personalization information either directly (or indirectly) to the relevant component. However, personalization must be accomplished in a secure manner. The previously described technology enables easy-to-use wireless security and supports secure personalization of the vehicle's components. The previously described technology also enables secure communications using wired networking technology.

In the following, an occupant means a living being that is a passenger in the vehicle. An operator is the occupant who is operating the vehicle.

One aspect of the invention is that the vehicle contains at least one component that is or contains a prospective member device. One skilled in the art will understand that once the prospective member device receives a credential, it can make the credential available to other components, can act as a router to secure outside communications, or that each component can be individually secured. In the case where the member device is permitted to form credential chains, the member device can also extend access to another component through delegation: That is, the member device may issue a certificate to the other component thus linking together the certificate it owns, to form a chain of credentials which allows the second device to be a member.

Following the previously described technology, a credential is established by exchanging key commitment information over a preferred channel between a credential issuing device and the prospective member device to pre-authenticate the prospective member device. Once the prospective member device is pre-authenticated, the credential issuing device receives a public key from the prospective member device and verifies the public key with the key commitment information. Finally, the credential issuing device automatically provisions the prospective member device with the credential at which time the prospective member device becomes a member device associated with the vehicle. Now, the operator can securely communicate personalization information to the vehicle through said member device using the credential. This communication can be accomplished by any other device that has been provisioned to be a member device of the vehicle including devices that can access the vehicle over a network. Thus, an operator of the vehicle can use his/her key device to setup the credential simply by accessing a location-limited channel to pre-authenticate the device, and provide the device with the credential as has been previously described. One skilled in the art will understand that member devices can freely communicate with each other in a secure manner. Thus, by being a member of the group, the device is assured that appropriate authorization has been provided for the operations requested of the device (even if the request was from some member device other than the credential issuing device).

The credential issuing device can be any device that can provide the credential. Such devices include (for example, but without limitation) a personal data assistant including a handheld computer, an appropriately enabled cell phone, a computer, an appropriately enabled camera, a dedicated key device (such as an electronic key, or physical key that is appropriately enabled), a smart card, an appropriately enabled wearable device (for example, a ring, necklace, article of clothing or jewelry), and appropriately enabled subscriber identification module (SIM).

When the operator of the vehicle changes, the new operator can change some or all of the vehicle's parameters by revoking the prior credential, and supplying his/her own. Another way is for the current operator to provide his/her credential to another such that the other has the same or some selection of the capabilities of the current operator.

The personalization information can include protected information related to an occupant or operator of the vehicle. This protected information can include information such as (for example, but without limitation) spatial coordinate data (for example a GPS provided location), personal identification data of said occupant (such as the occupant's name), account identification data (such as an auto toll account number), insurance-related data; vehicle identification data (such as the registration, or vehicle identification number), vehicle operation data (such as speed, diagnostic data, fuel usage, or other vehicle operation data), financial data (such as a credit card account number), telephone number data (such as SIM information or occupant's mobile phone number), wireless network data, travel data (such as current position and speed), and vehicle occupancy data (such as the identities of the vehicle's occupants. Furthermore, the personalization information can include information used to associate a monitoring service (such as GM's OnStar™ service) with the operator instead of the vehicle being operated.

The member device in the vehicle can securely communicate with an external member device that is remote from the vehicle. For example, an operator can securely send location information to his/her home computer for access by the operator's family, or to an external member device that was pre-authenticated over the telephone system so that a hotel reservation can be confirmed.

The personalization information can include protected information related to the preferences of the operator of the vehicle. In this case, the protected information can include operating control preferences data, radio operation preferences data, location preferences data, navigation data, controllable environmental preferences, vehicle security system preferences, and vehicle instrument cluster display preferences.

Because the types of the vehicle's controls are standard, but the placement need not be, operating control preferences data can include information about which physical control activates what desired function (for example, some cars have the windshield wiper control on the left hand side of the steering column while others have it on the right hand side—an operator of an appropriately configured vehicle could change which controls (including how controls function) were associated with operator functions according to his/her preferences such that, for example, the controls of rental car driven by the operator were in approximately the same location as the operator's own car, or specifying that when the windshield wipers are on to automatically turn on the lights, specify which electronic window controls were active, which cabin lights could be switched on by another occupant, as compared to cabin lights controlled by the operator, etc.).

In addition, an occupant's preferences can be sent to the entertainment component 807 to specify satellite radio stations, AM or FM broadcast stations, type of station, etc. and by so doing configuring the vehicle to the occupant's entertainment preference. In addition, the occupant can transmit location preferences data to the trip computer/global positioning component 805 to specify what type of services are of interest to the occupant (for example, specifying the brand of fuel, type of food etc.).

The operator can also provide navigation data such that the planned route, destination, and stops or other route information is securely sent to the trip computer/global positioning component 805.

In a similar manner, the occupant can provide preferences to the comfort component 809 (for example, temperature, seat position, mirror position etc.), the display component 813 (for example the intensity of lights, what information is provided on the console or heads-up-display, the safety component 815 (for example, preferences for maximum speed, parameters for inter-vehicle spacing, minimum tire pressure, etc.), and the security component 817 (for example, specifying vehicle access parameters, key codes, etc.).

The operator can also delegate selected operator functions to another occupant.

Another aspect of the invention is that of automatically provisioning a vehicle by a rental franchise (or other organization that manages a fleet of vehicles). Here each vehicle can be provisioned by the use of an enrollment station that is in communication with the credential issuing device located at the organization's headquarters. For example, in one embodiment, other enrollment station can issue a credential that allows an operator—or other occupant—(and by delegation, all devices the occupant chooses) access to the vehicle's security component 817. The certificate can be configured to expire at a safe time after the term of the rental contract such that the occupant would no longer have access to the vehicle. In another embodiment, the operator can issue a credential to a rental company (for example using a phone line as a location-limited channel) who then provisions the vehicle with the certificate. Thus, for example, a rental car could be locked on the lot and only accessible to the renter (and possibly the company's employees) and could have the renter's personalization data already available to the car's components. The fleet management organization can monitor the vehicles so provisioned and can obtain operational status from each of the vehicles (such as location, speed, miles driven, fuel level, etc.). This allows the fleet management organization to offer secure remote vehicle check-out and check-in (even if the vehicle is returned to, for example, an airport parking lot instead of the rental car parking lot). In addition, this capability provides the ability for fleet management to monitor vehicle abuse. Furthermore, a current renter (for example, a former occupant) of the vehicle who has a credential for the vehicle can also obtain the vehicle's current location (for example, to help find the vehicle in a parking lot). The fleet management organization's credential can co-exist with the operator's credential.

One other aspect of the invention is that of revoking the credential provided to the vehicle, thus removing the vehicle from the trusted group. The revocation can be accomplished either explicitly, or after some time period (for example, after the rental period is complete—and assuming the vehicle is not being operated).

As previously described, the secure credential infrastructure can be a public key infrastructure where the credential issuing authority is a certification authority and the credential is a public key certificate.

In addition, the credential issuing device can create a public key pair and provide it to the prospective member device over the preferred channel. It can also create and store a trusted key pair, and establish and store a certification authority public key certificate.

One skilled in the art will understand that the network transmits information (such as the previously described data as well as data that defines a computer program). Generally, the information is embodied within a carrier-wave. The term "carrier-wave" includes electromagnetic signals, visible or invisible light pulses, signals on a data bus, or signals transmitted over any wire, wireless, or optical fiber technology that allows information to be transmitted over a network. Programs and data are commonly read from both tangible physical media (such as a compact, floppy, or magnetic disk) and from a network. Thus, the network, like a tangible physical media, is a computer usable data carrier.

In addition, the flowcharts provided herein are for illustrative purposes and are used to teach one embodiment of the invention. Other flowcharts that incorporate the underlying ideas (or modifications thereof) are to be considered as equivalent.

One skilled in the art will understand that embodiments of the invention vastly simplify the creation, management, and maintenance of secure credential infrastructure. Thus, a PKI can be cheaply and efficiently created and administered. Furthermore, the characteristics of some embodiments now enables the use of secure credential infrastructure in applications and environments where the expense and overhead related to traditional secure credential infrastructure were prohibitive.

From the foregoing, it will be appreciated that embodiments of the invention have (without limitation) the following advantages:
1) ability to quickly and simply create, maintain, and manage secure credential infrastructure associated with vehicles by non-security exports;
2) dramatically improved security available to the public because of the decrease in cost and effort in creating a secure credential infrastructure now enables the computer layperson to keep their communications related to a vehicle secure;
3) enables simple provisioning of vehicle components and/or devices (either with credentials, with network-specific information, application-specific information, or combination of these; and
4) enables the ability for a vehicle to join a PKI without requiring onerous trust verification processes.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A computer controlled method to personalize a vehicle that is associated with a prospective member device, the method comprising:
    establishing a credential by exchanging a key's commitment information over a preferred channel between a credential issuing device and said prospective member device on the vehicle to pre-authenticate said prospective member device;
    wherein the preferred channel is a short-range communications channel that excludes telephone communication;
    wherein the preferred channel has a physical identification property that requires identification be based on physical proximity;
    wherein the preferred channel does not prevent an attacker from monitoring transmissions on the preferred channel; and
    wherein the preferred channel has an authenticity property that allows a legitimate party to detect the number of participants in a communication such that an attacker cannot transmit over the preferred channel without detection;
    verifying that a public key received from said prospective member device match said key's commitment information;
    provisioning said prospective member device with said credential, whereby said prospective member device becomes a member device associated with said vehicle; and
    securely communicating personalization information to said vehicle through said member device using said credential.

2. The computer controlled method of claim 1, wherein said personalization information comprises protected information related to an occupant of said vehicle.

3. The computer controlled method of claim 2, wherein said protected information includes at least one datum selected from a group consisting of spatial coordinate data, personal identification data of said occupant, account identification data, insurance-related data; vehicle identification data, vehicle operation data, financial data, telephone number data, wireless network data, travel data, and vehicle occupancy data.

4. The computer controlled method of claim 2, wherein said protected information includes at least one datum selected from a group consisting of operating control preferences data, radio operation preferences data, location preferences data, navigation data, controllable environmental preferences, vehicle security system preferences, and vehicle instrument cluster display preferences.

5. The computer controlled method of claim 1, wherein said credential issuing device is selected from the group consisting of a personal data assistant, a cell phone, a computer, a camera, a dedicated key device, a smart card, a personally wearable device, and a subscriber identification module.

6. The computer controlled method of claim 1, wherein said credential issuing device includes said credential issuing authority.

7. The computer controlled method of claim 1, wherein said preferred channel is a location-limited channel.

8. The computer controlled method of claim 1, wherein the step of automatically provisioning is performed by an enrollment station in communication with said credential issuing device.

9. The computer controlled method of claim 1, wherein said secure credential infrastructure is a public key infrastructure, said credential issuing authority is a certification authority and said credential is a public key certificate.

10. The computer controlled method of claim 9, wherein the step of exchanging further comprises steps of:
   creating a public key pair for said prospective member device; and
   sending said public key pair to said prospective member device over said preferred channel.

11. The computer controlled method of claim 9, further comprising steps of:
   creating a trusted key pair;
   storing said trusted key pair;
   establishing a certification authority public key certificate; and
   storing said certification authority public key certificate.

12. The computer controlled method of claim 1, further comprising a step of revoking said credential.

13. The computer controlled method of claim 1, further comprising a step of using said member device to securely communicate to an external member device that is remote from said vehicle.

14. The computer controlled method of claim 1, further comprising a step of said member device communicating with a second member device.

15. A prospective member device capable of personalizing a vehicle that is associated with the prospective member device, the prospective member device comprising:
   a credential establishment mechanism configured to establish a credential by exchanging a key's commitment information over a preferred channel between a credential issuing device and the prospective member device;
   wherein the preferred channel is a short-range communications channel which excludes telephone communication;
   wherein the preferred channel has a physical identification property that requires identification be based on physical proximity;
   wherein the preferred channel does not prevent an attacker from monitoring transmissions on the preferred channel; and
   wherein the preferred channel has an authenticity property that allows a legitimate party to detect the number of participants in the communication such that an attacker cannot transmit over the preferred channel without detection;
   a pre-authentication mechanism configured to verify that a public key associated with the prospective member device match said key commitment information;
   a credential provisioning mechanism configured to receive a credential whereby said prospective member device on the vehicle becomes a member device associated with said vehicle; and
   a communication mechanism configured to securely communicate personalization information for said vehicle through said member device using said credential.

16. The prospective member device of claim 15, wherein said personalization information comprises protected information related to an occupant of said vehicle.

17. The prospective member device of claim 16, wherein said protected information includes at least one datum selected from a group consisting of spatial coordinate data, personal identification data of said occupant, account identification data, insurance-related data; vehicle identification data, vehicle operation data, financial data, telephone number data, wireless network data, travel data, and vehicle occupancy data.

18. The prospective member device of claim 16, wherein said protected information includes at least one datum selected from a group consisting of operating control preferences data, radio operation preferences data, location preferences data, navigation data, controllable environmental preferences, vehicle security system preferences, and vehicle instrument cluster display preferences.

19. The prospective member device of claim 15, wherein said credential is received from a credential issuing device.

20. The prospective member device of claim 15, wherein said preferred channel is a location-limited channel.

21. The prospective member device of claim 15, wherein said secure credential infrastructure is a public key infrastructure, said credential issuing authority is a certification authority and said credential is a public key certificate.

22. The prospective member device of claim 21, wherein the key receiver mechanism further comprises a public key pair receiver mechanism configured to receive said public key pair over said preferred channel.

23. The prospective member device of claim 15, further configured to securely communicate to an external member device that is remote from said vehicle.

24. The prospective member device of claim 15, further comprising a secure communication mechanism configured to securely communicate with a second member device.

25. A vehicle including a plurality of computerized devices, at least one of said plurality of computerized devices being a prospective member device comprising:
   a secure credential infrastructure creation mechanism configured to create a secure credential infrastructure;
   a credential establishment mechanism comprising: at least one port configured to establish a preferred channel;
   wherein the preferred channel is a short-range communications channel which excludes telephone communication;
   wherein the preferred channel has a physical identification property that requires identification be based on physical proximity;
   wherein the preferred channel does not prevent an attacker from monitoring transmissions on the preferred channel; and
   wherein the preferred channel has an authenticity property that allows a legitimate party to detect the number of participants in the communication such that an attacker cannot transmit over the preferred channel without detection;
   a pre-authentication mechanism configured to verify that a public key associated with the prospective member device match said key commitment information;
   a credential provisioning mechanism configured to receive a credential whereby said prospective member device on the vehicle becomes a member device associated with said vehicle; and
   a communication mechanism configured to securely communicate personalization information for said vehicle through said member device using said credential.

* * * * *